United States Patent
Li et al.

(10) Patent No.: US 12,315,229 B2
(45) Date of Patent: May 27, 2025

(54) MODEL GENERATING APPARATUS AND METHOD

(71) Applicant: HON HAI PRECISION INDUSTRY CO., LTD., New Taipei (TW)

(72) Inventors: Yung-Hui Li, New Taipei (TW); Ting-Hsuan Lee, New Taipei (TW); Nien-Yi Jan, New Taipei (TW); Wei-Bin Lee, New Taipei (TW); Yen-Cheng Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 385 days.

(21) Appl. No.: 18/150,800

(22) Filed: Jan. 6, 2023

(65) Prior Publication Data
US 2023/0215147 A1   Jul. 6, 2023

Related U.S. Application Data

(60) Provisional application No. 63/266,461, filed on Jan. 6, 2022.

(51) Int. Cl.
*G06V 10/774* (2022.01)
*G06N 3/0895* (2023.01)
(Continued)

(52) U.S. Cl.
CPC ......... *G06V 10/774* (2022.01); *G06N 3/0895* (2023.01); *G06V 10/761* (2022.01);
(Continued)

(58) Field of Classification Search
None
See application file for complete search history.

(56) References Cited

U.S. PATENT DOCUMENTS

| 11,153,566 B1 * | 10/2021 | Tao ...................... H04N 19/124 |
| 11,881,003 B2 * | 1/2024 | Besenbruch ........... G06N 3/044 |

(Continued)

FOREIGN PATENT DOCUMENTS

| CN | 110991549 A | 4/2020 |
| CN | 111695596 A | 9/2020 |

(Continued)

OTHER PUBLICATIONS

Heng Liu, et al., "Generating Universal Adversarial Perturbations with Generative Adversarial Networks", Netinfo Security, 2020, p. 57-64, vol. 20(5), Third Research Institute of Ministry of Public Security and China Computer Federation, P.R.China. doi: 10.3969/j.issn. 1671-1122.2020.05.007.

(Continued)

*Primary Examiner* — Anand P Bhatnagar
(74) *Attorney, Agent, or Firm* — CKC & Partners Co., LLC

(57) ABSTRACT

A model generating apparatus and method are provided. The apparatus receives a plurality of sample images. The apparatus generates a plurality of adversarial samples corresponding to the sample images. The apparatus inputs the sample images and the adversarial samples respectively to a first encoder and a second encoder in a self-supervised neural network to generate a plurality of first feature extractions and a plurality of second feature extractions. The apparatus calculates a similarity of each of the first feature extractions and the second feature extractions to train the self-supervised neural network. The apparatus generates a task model based on the first encoder and a plurality of labeled data.

20 Claims, 4 Drawing Sheets

(51) Int. Cl.
  *G06V 10/74* (2022.01)
  *G06V 10/764* (2022.01)
  *G06V 10/77* (2022.01)
  *G06V 10/778* (2022.01)
  *G06V 10/82* (2022.01)

(52) U.S. Cl.
  CPC ........ *G06V 10/764* (2022.01); *G06V 10/7715* (2022.01); *G06V 10/7784* (2022.01); *G06V 10/82* (2022.01)

(56) References Cited

U.S. PATENT DOCUMENTS

| | | | | |
|---|---|---|---|---|
| 12,008,861 | B2* | 6/2024 | Nelson | G07F 17/3241 |
| 12,022,077 | B2* | 6/2024 | Besenbruch | G06N 3/084 |
| 12,095,994 | B2* | 9/2024 | Besenbruch | H04N 19/91 |
| 12,160,579 | B2* | 12/2024 | Besenbruch | G06N 3/047 |
| 12,254,064 | B2* | 3/2025 | Chen | G06F 18/243 |
| 12,256,075 | B2* | 3/2025 | Besenbruch | H04N 19/126 |
| 2019/0295302 | A1* | 9/2019 | Fu | G06T 11/00 |
| 2021/0192357 | A1* | 6/2021 | Sinha | G06N 3/088 |
| 2022/0053195 | A1* | 2/2022 | Hurwitz | G06N 3/04 |
| 2023/0306603 | A1* | 9/2023 | Rhodes | G06T 7/97 |
| 2023/0396801 | A1* | 12/2023 | Racape | H04N 19/42 |
| 2024/0195971 | A1* | 6/2024 | Besenbruch | G06V 10/774 |
| 2024/0312069 | A1* | 9/2024 | Besenbruch | G06N 20/10 |

FOREIGN PATENT DOCUMENTS

| | | |
|---|---|---|
| CN | 112215292 A | 1/2021 |
| CN | 113191268 A | 7/2021 |
| CN | 113361648 A | 9/2021 |
| CN | 113554089 A | 10/2021 |
| DE | 102018115440 A1 | 1/2019 |
| TW | 202123043 A | 6/2021 |
| TW | 202123079 A | 6/2021 |
| WO | 2020239196 A1 | 12/2020 |

OTHER PUBLICATIONS

Hao Sun, et al., "Self-supervised Contrastive Learning for Improving the Adversarial Robustness of Deep Neural Networks", Journal of Signal Processing, 2021, p. 903-911, vol. 37(6), Chinese Institute of Electronics, P.R.China. DOI: 10.16798/j.issn. 1003-0530.2021.06.001.

* cited by examiner

MODEL GENERATING APPARATUS AND METHOD

CROSS-REFERENCE TO RELATED APPLICATION

This application claims priority to U.S. Provisional Application Ser. No. 63/266,461, filed Jan. 6, 2022, which is herein incorporated by reference in its entirety.

BACKGROUND

Field of Invention

The present invention relates to a model generating apparatus and method. More particularly, the present invention relates to a model generating apparatus and method that can rapidly generate task models that are resistant to adversarial attacks.

Description of Related Art

Due to the lack of robustness, deep neural networks have been shown to be particularly unstable to adversarial perturbation of the input.

Therefore, the unstable model generated under such a disadvantage may bring execution risks to downstream applications. For example, when performing safety-critical tasks for self-driving cars, adversarial attacks may cause the self-driving car to take unnecessary actions (e.g., misinterpreting the meaning of traffic signs).

In the prior art, although the model can be trained by generating adversarial examples to enhance the robustness of the deep neural network model. However, adding adversarial samples into the training data will reduce the accuracy of the trained model, and since the aforementioned method needs to retrain the entire model, the cost of training the model will increase. In addition, when targeting different downstream applications, it is necessary to retrain an independent model for different applications, so it is hard to quickly generate multiple task models corresponding to different applications.

Accordingly, there is an urgent need for a technology that can quickly generate a task model which can defend against adversarial attacks.

SUMMARY

An objective of the present disclosure is to provide a model generating apparatus. The model generating apparatus comprises a storage, a transceiver interface, and a processor. The processor is electrically connected to the storage and the transceiver interface. The storage is configured to store a self-supervised neural network. The processor receives a plurality of sample images through the transceiver interface. The processor generates a plurality of adversarial samples corresponding to the sample images. The processor inputs the sample images and the adversarial samples respectively to a first encoder and a second encoder in the self-supervised neural network to generate a plurality of first feature extractions and a plurality of second feature extractions, the first feature extractions are generated by the first encoder, and the second feature extractions are generated by the second encoder. The processor calculates a similarity of each of the first feature extractions and the second feature extractions to train the self-supervised neural network. The processor generates a task model based on the first encoder and a plurality of labeled data.

Another objective of the present disclosure is to provide a model generating method, which is adapted for use in an electronic apparatus. The electronic apparatus comprises a storage, a transceiver interface, and a processor, the storage is configured to store a self-supervised neural network. The model generating method comprises the following steps: receiving a plurality of sample images through the transceiver interface; generating a plurality of adversarial samples corresponding to the sample images; inputting the sample images and the adversarial samples respectively to a first encoder and a second encoder in the self-supervised neural network to generate a plurality of first feature extractions and a plurality of second feature extractions, wherein the first feature extractions are generated by the first encoder, and the second feature extractions are generated by the second encoder; calculating a similarity of each of the first feature extractions and the second feature extractions to train the self-supervised neural network; and generating a task model based on the first encoder and a plurality of labeled data.

According to the above descriptions, the model generating technology (at least comprises the apparatus and the method) provided by the present disclosure generates a plurality of adversarial samples corresponding to the plurality of sample images, and trains the first encoder and the second encoder in the self-supervised neural network based on the sample images and the adversarial samples to enhance the feature extraction ability of the first encoder. Therefore, the ability of the first encoder to resist adversarial attacks can be improved. In addition, the model generation technology provided by the present disclosure can quickly generate task models for various downstream tasks based on the trained first encoder and a plurality of labeled data, thereby solving the problem of the training cost of the entire task model in the prior art. Furthermore, the model generating technology provided by the present disclosure only uses the labeled data for fine-tuning when training the task model, and does not need to add adversarial samples to the training data. Therefore, the accuracy of the trained model will not be reduced, and the problem of accuracy decline caused by the prior art will be solved.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a model generating apparatus and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
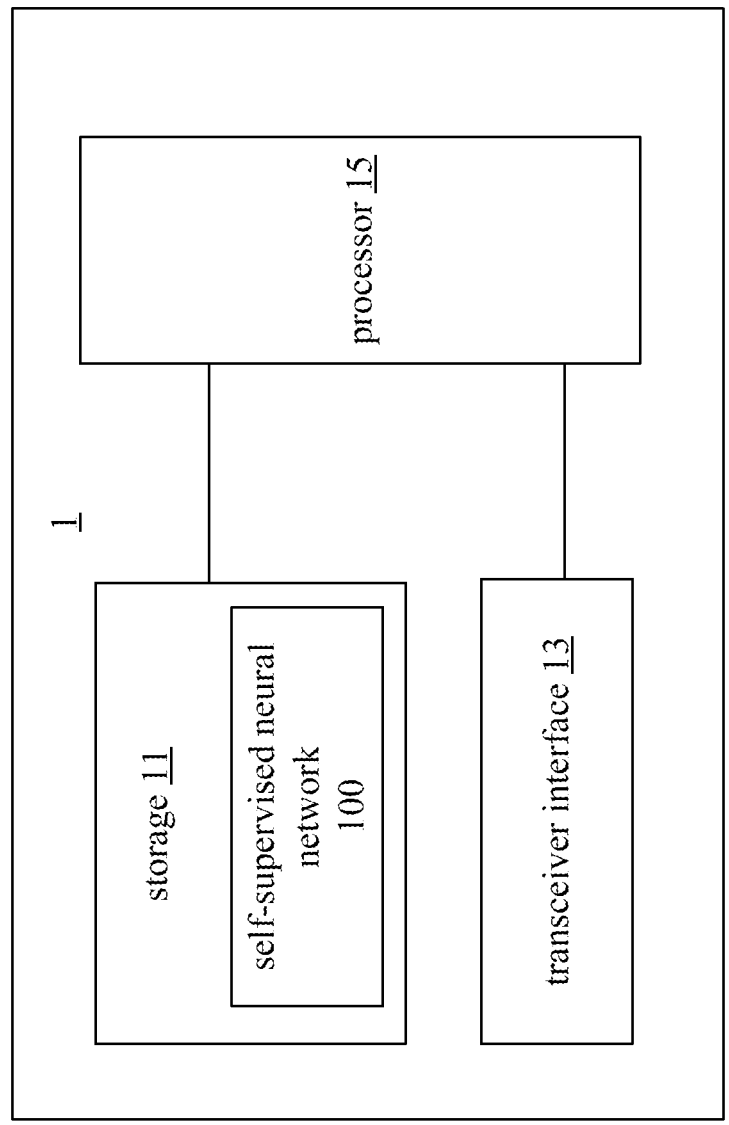
FIG. 1 is a schematic view depicting a model generating apparatus of the first embodiment.

A first embodiment of the present disclosure is a model generating apparatus 1 and a schematic view of which is depicted in FIG. 1. In the present embodiment, the model generating apparatus 1 comprises a storage 11, a transceiver interface 13, and a processor 15, and the processor 15 is electrically connected to the storage 11 and the transceiver interface 13.

It shall be appreciated that the storage 11 may be a memory, a Universal Serial Bus (USB) disk, a hard disk, a Compact Disk (CD), a mobile disk, or any other storage medium or circuit known to those of ordinary skill in the art and having the same functionality. The transceiver interface 13 is an interface capable of receiving and transmitting data or other interfaces capable of receiving and transmitting data and known to those of ordinary skill in the art. The transceiver interface 13 can receive data from sources such as external apparatuses, external web pages, external applications, and so on. The processor 15 may be any of various processors, Central Processing Units (CPUs), microprocessors, digital signal processors or other computing apparatuses known to those of ordinary skill in the art.

In the present embodiment, as shown in FIG. 1, the storage 11 is configured to store the self-supervised neural network 100, the model generating apparatus 1 may train an encoder for feature extraction through the self-supervised neural network 100. The specific content and implementation details of the self-supervised neural network 100 will be described in detail later.

Figure 2:
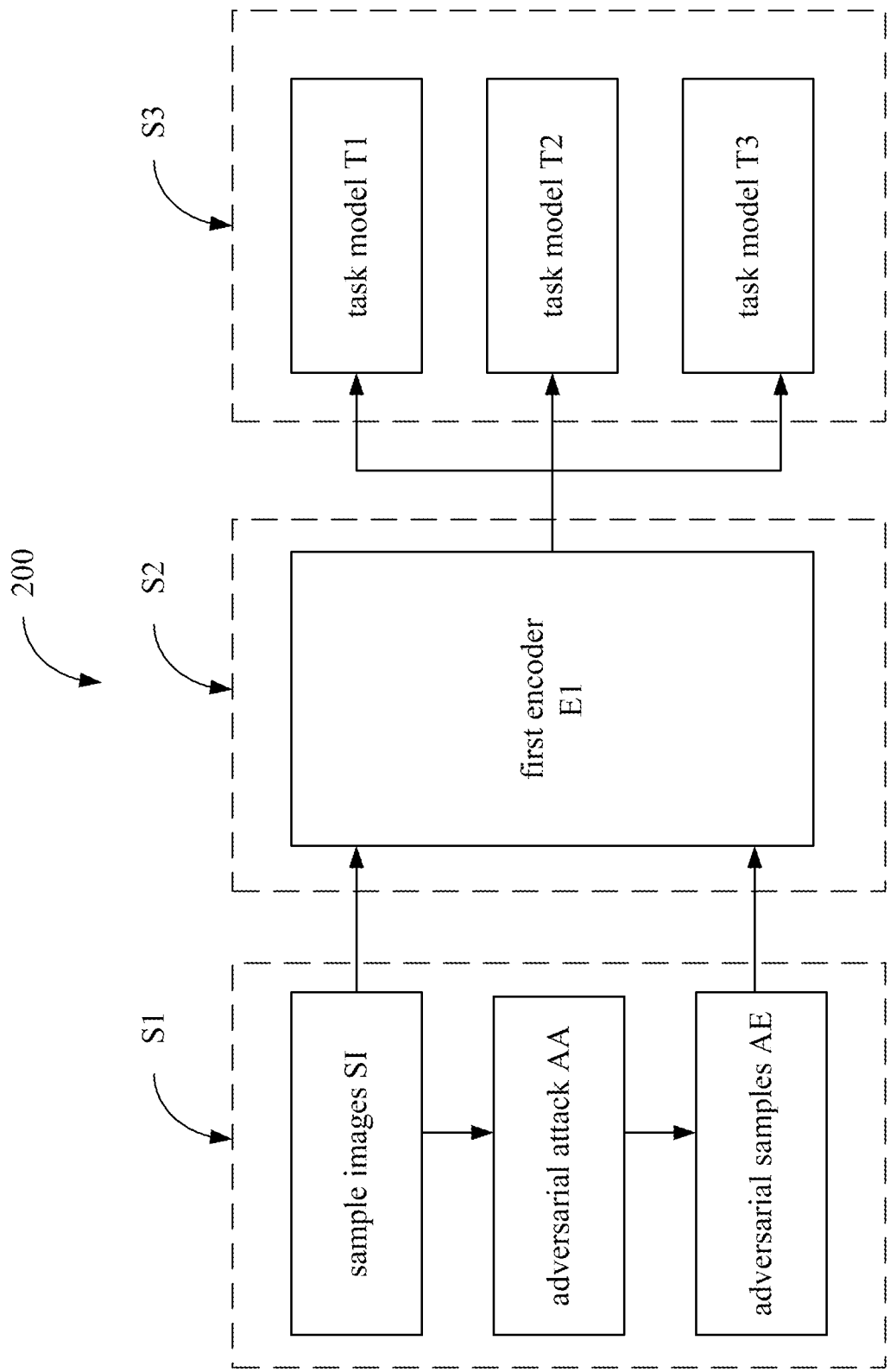
FIG. 2 is a schematic view depicting an operation of the first embodiment.

For ease of understanding, the operation of the first embodiment of the present disclosure is briefly described first, and please refer to the operation schematic view 200 in FIG. 2. As shown in FIG. 2, the present disclosure mainly includes three stages of operation, which are a training sample generated stage S1, a training robust encoder stage S2, and a fine-tuned stage S3 in sequence.

Specifically, as shown in FIG. 2, in the training sample generated stage S1, based on a plurality of sample images SI, the model generating apparatus 1 may generate a plurality of adversarial examples AE that have undergone the adversarial attack AA through the operation of the adversarial attack AA.

Next, as shown in FIG. 2, in the training robust encoder stage S2, the model generating apparatus 1 may train the encoder E1 based on the self-supervised neural network 100 and the training data generated in the previous stage (i.e., the sample images SI and the adversarial samples AE). Finally, in the fine-tuned stage S3, the model generating apparatus 1 may generate task models of corresponding downstream tasks, such as the task model T1, the task model T2 and the task model T3, based on the trained encoder E1.

The following paragraphs will specifically describe the content and implementation details related to the present disclosure. In the present embodiment, as shown in FIG. 1, the storage 11 may be used to store the self-supervised neural network 100. In the present disclosure, the model generating apparatus 1 may train the encoder E1 for feature extraction through the self-supervised neural network 100, and update the encoder E1 through another encoder E2 to improve the ability of the encoder E1 to resist adversarial attacks.

In some embodiments, the self-supervised neural network 100 is composed of an online neural network and a target neural network. In the training stage, the target neural network assists in training the online neural network to adjust the weights and parameters of the feature extraction of certain image blocks of the online neural network (i.e., the purpose is to avoid feature extraction outcomes of image blocks being changed by adversarial attacks).

Figure 3:
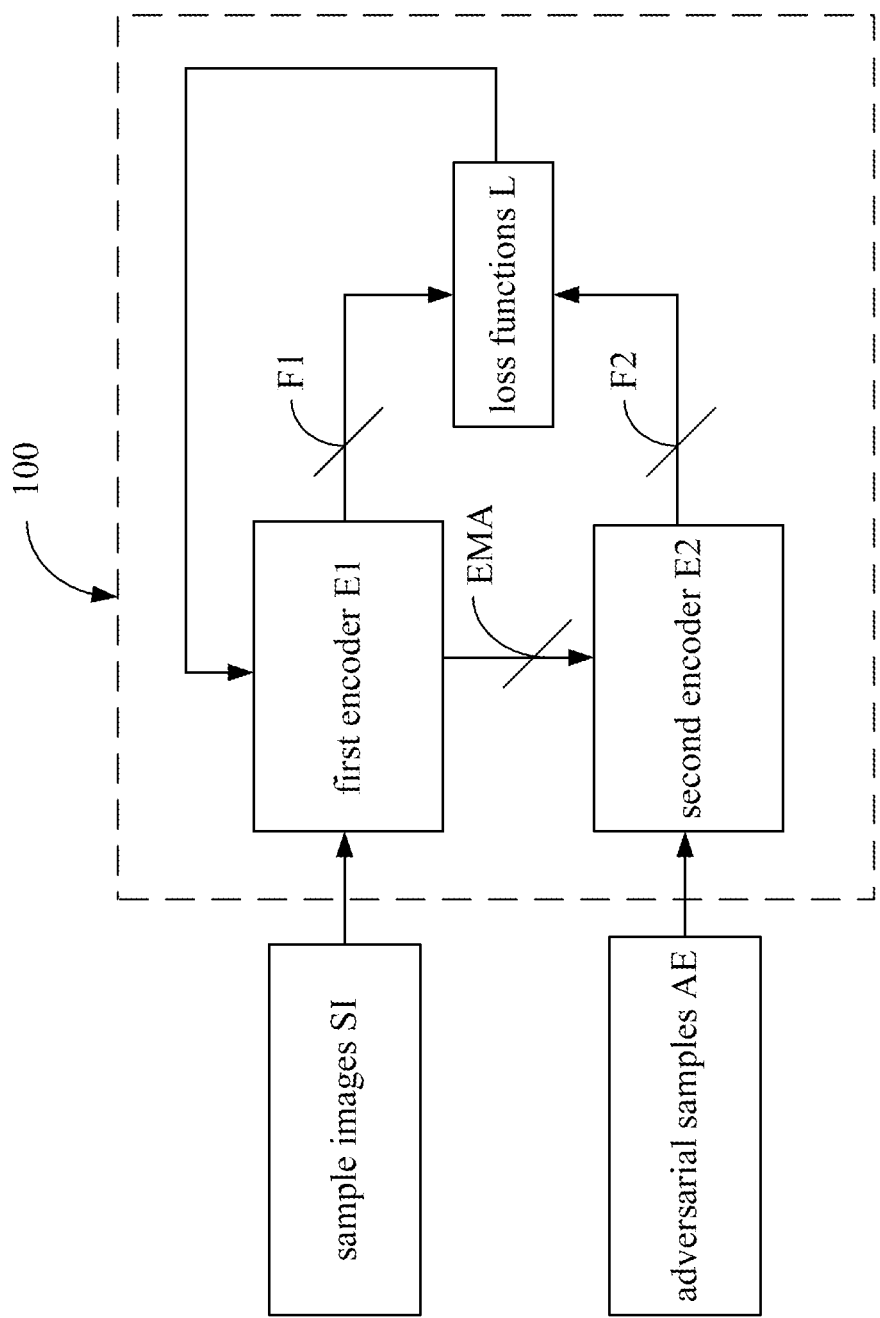
FIG. 3 is a schematic view depicting an operation of the self-supervised neural network of the first embodiment.

Specifically, as shown in FIG. 3, in the self-supervised neural network 100, the first encoder E1 corresponds to the online neural network, and the second encoder E2 corresponds to the target neural network. In some embodiments, the self-supervised neural network 100 used in the present disclosure may be a self-supervised neural network used in the BOYL (Bootstrap Your Own Latent) architecture.

Next, the operations of the training sample generated in stage S1 will be described below. In the present embodiment, the processor 15 may receive a plurality of sample images through the transceiver interface 13. Then, the processor 15 may generate a plurality of adversarial samples corresponding to the sample images based on the sample images.

Specifically, the processor 15 performs an adversarial attack on each of the sample images (for example, adding some small perturbations to the sample images) to generate the adversarial samples corresponding to each of the sample images. It shall be appreciated that the processor 15 may generate perturbations through various adversarial attack methods, such as calculating the influence of each pixel on the classification according to the gradient of the model to generate the perturbations added to the sample image.

For example, adversarial attacks may include methods such as FGSM, BIM, MIM, DeepFool, and C&W among white-box attacks. For another example, adversarial attacks may also include methods such as ZOO, NES, NAttack, and Boundary attack among black-box attacks. It shall be appreciated that the present disclosure does not limit the content of the adversarial attack used by the model generating apparatus 1 to generate adversarial samples.

In some embodiments, in order to make the first encoder E1 trained by the model generating apparatus 1 have a better defense effect (i.e., robustness), the processor 15 may generate a plurality of training images corresponding to different adversarial attacks for the same sample image. Specifically, the adversarial samples generated through the adversarial attack have a many-to-one relationship with the sample images. For example, corresponding to the same sample image, the processor 15 can generate three adversarial samples corresponding to the sample image through the adversarial attack methods of FGSM, BIM, and MIM.

Next, in the training robust encoder stage S2, the processor 15 inputs the sample images and the adversarial samples to the self-supervised neural network 100 for training. For ease of understanding, please refer to FIG. 3. In the present embodiment, the processor 15 respectively inputs the sample images SI and the adversarial samples AE to the first encoder E1 and the second encoder E2 in the self-supervised neural network 100 to generate a plurality of first feature extractions F1 and a plurality of second feature extractions F2. As shown in FIG. 3, the first feature extractions F1 are generated by the first encoder E1, and the second feature extractions F2 are generated by the second encoder E2.

It shall be appreciated that in the present disclosure, the online neural network may be composed of a first encoder E1, a representation layer, a projection layer, a prediction layer, etc., to generate the first feature extractions F1. In addition, the target neural network may be composed of a second encoder E2, a representation layer, a projection layer, etc., to generate the second feature extractions F2. Those of ordinary skill in the art shall appreciate the methods by which the encoder generates the feature extractions based on the foregoing descriptions. Therefore, the details will not be repeated herein.

In some embodiments, before training, the processor 15 further classifies the sample images and the adversarial samples to generate corresponding training sets, so that the processor 15 may input each corresponding training set to the first encoder E1 and the second encoder E2 of the self-supervised neural network 100 to perform each round of training during the subsequent training. Specifically, the processor 15 classifies the sample images and the adversarial samples to generate a plurality of corresponding training sets, wherein each of the corresponding training sets comprises a first sample image of the sample images and a first adversarial sample corresponding to the first sample image.

It shall be appreciated that the corresponding training set may comprise a sample image and an adversarial sample corresponding to the sample image. If the sample image has a plurality of corresponding adversarial samples, the processor 15 may generate a plurality of corresponding training sets.

Next, in the present embodiment, the processor 15 calculates a similarity of each of the first feature extractions F1 and the second feature extractions F2 to train the self-supervised neural network 100.

In some embodiments, the processor 15 may input each of the corresponding training sets to the encoder in the self-supervised neural network 100 for training. Specifically, the processor 15 performs the following operations for each of the corresponding training sets: inputting the first sample image to the first encoder E1 to generate the first feature extractions F1 (i.e., a corresponding first feature extraction) corresponding to the first sample image; and inputting the first adversarial sample to the second encoder E2 to generate the second feature extractions F2 (i.e., a corresponding second feature extraction) corresponding to the first adversarial sample.

In some embodiments, the processor 15 may calculate the similarity of feature extractions generated by each of the corresponding training sets to train the self-supervised neural network 100. Specifically, the processor 15 performs the following operations for each of the corresponding training sets: calculating the similarity between the first feature extractions F1 (i.e., the corresponding first feature extraction) corresponding to the first sample image and the second feature extractions F2 (i.e., the corresponding second feature extraction) corresponding to the first adversarial sample to train the self-supervised neural network 100.

In some embodiments, the similarity of feature extractions may be calculated through a plurality of loss functions L, and the processor 15 further updates the first encoder E1 based on the calculation result of the loss functions L.

Specifically, the processor 15 calculates the similarity of each of the first feature extractions F1 and the second feature extractions F2 based on a plurality of loss functions L. Next, as shown in FIG. 3, the processor 15 updates the first encoder E1 based on the similarity corresponding to the loss functions L. It shall be appreciated that the present disclosure does not limit the content of the loss functions L used by the model generating apparatus 1, and any loss function that can be used to determine whether the feature extractions are similar can be used in the present disclosure.

In some embodiments, in order to increase the difference between the second encoder E2 and the first encoder E1, a smoothing or averaging operation may be performed on the parameters of the second encoder E2 to increase the robustness of the encoder. For example, as shown in FIG. 3, the processor 15 may further update the second encoder E2 based on an exponential moving average (EMA) corresponding to the first encoder E1.

It shall be appreciated that since each of the adversarial samples is generated by the adversarial attacks (for example, adding some small perturbations to the sample images), the mutual training of the two neural networks (i.e., the online neural network and the target neural network) can effectively reduce the probability of misjudgment by the trained first encoder E1 for the image subjected to the adversarial attack, and improve the accuracy of the feature extraction of the first encoder E1.

Next, after the training of the self-supervised neural network 100 is completed (i.e., all corresponding training sets have been trained), the first encoder E1 already has the feature extraction ability to resist adversarial attacks. Therefore, in the fine-tuned stage S3, the processor 15 may use the first encoder E1 in the self-supervised neural network 100 as the basis for feature extraction, and then perform fine-tuning with other newly added layers corresponding to different applications (for example: full connection layers, decoders, etc.) to generate task models. Specifically, the processor 15 generates a task model based on the first encoder E1 and a plurality of labeled data.

It shall be appreciated that the labeled data is the labeled data (i.e., ground truth labels) for fine-tuning the task model trained by the new layer. In addition, the labeled data can be generated by experts manually labeling the data, or directly received by an external device (such as a database corresponding to the type of data) that has already been labeled. The present disclosure does not limit the means of obtaining the labeled data.

It shall be appreciated that the processor 15 may obtain the labeled data according to the application or requirement corresponding to the task model. For example, if the task model to be generated is related to face recognition (e.g., recognition task), the processor 15 may obtain the labeled data that has been labeled from at least one face image database.

In some embodiments, the processor 15 may concatenate different newly added layers after the first encoder E1 to obtain the feature extractions through the first encoder E1 based on the requirements of different applications, and quickly train the task model.

Specifically, the processor 15 concatenates at least one newly added layer after the first encoder, wherein the at least one newly added layer corresponds to a downstream task. Next, the processor 15 inputs the labeled data into the first encoder and the at least one newly added layer to fine-tune the at least one newly added layer. Finally, the processor 15 generates the task model corresponding to the downstream task based on the first encoder and the at least one newly added layer after fine-tuning.

For example, as shown in FIG. 2, the task model T1 may be a task model for performing a detection task, and the task model T1 may be used to identify the corresponding category in the sample image (for example: the sample image corresponding to an airplane category). The task model T2 may be a task model for performing a segmentation task, and the task model T2 may be used to generate the segmentation of the contour of the object in the sample image. The task model T3 may be a task model for performing a reconstruction task, and the task model T3 may reconstruct the image subjected to the adversarial attack back to the original sample image (i.e., filter out the noise/perturbations changed by the adversarial attack).

Taking generating a task model for the detection task as an example, the processor 15 may concatenate a plurality of fully-connections layers for detection after the first encoder E1, and calculate the loss function through the results predicted by the fully-connections layers and the results of the labeled data to update the parameters and weights of the fully-connections layers to quickly train the task model for the detection task.

Taking generating the task model for the segmentation task as an example, the processor 15 may concatenate a decoder for segmentation after the first encoder E1, and calculate the loss function through the results predicted by the decoder and the results of the labeled data to update the parameters and weights of the decoder to quickly train the task model for the segmentation task.

Taking generating a task model for the reconstruction task as an example, the processor 15 may concatenate the decoder for reconstruction after the first encoder E1, and calculate the loss function through the results predicted by the decoder and the results of the labeled data to update the parameters and weights of the decoder to quickly train the task model for the reconstruction task.

According to the above descriptions, the model generating apparatus 1 provided by the present disclosure generates a plurality of adversarial samples corresponding to the plurality of sample images, and trains the first encoder and the second encoder in the self-supervised neural network based on the sample images and the adversarial samples to enhance the feature extraction ability of the first encoder. Therefore, the ability of the first encoder to resist adversarial attacks can be improved. In addition, the model generation technology provided by the present disclosure can quickly generate task models for various downstream tasks based on the trained first encoder and a plurality of labeled data, thereby solving the problem of the training cost of the entire task model in the prior art. Furthermore, the model generating apparatus 1 provided by the present disclosure only uses the labeled data for fine-tuning when training the task model, and does not need to add adversarial samples to the training data. Therefore, the accuracy of the trained model will not be reduced, and the problem of accuracy decline caused by the prior art will be solved.

Figure 4:
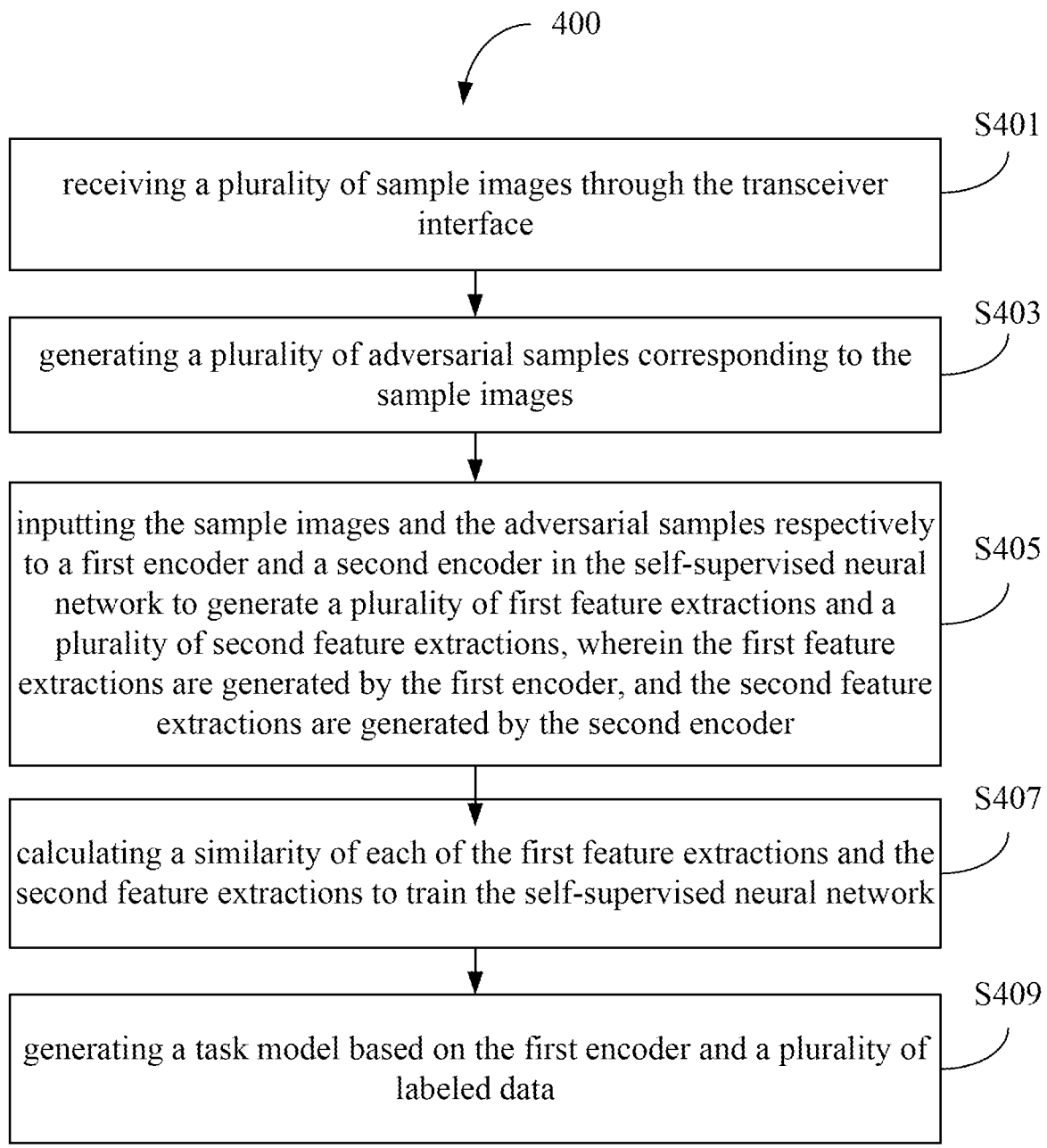
FIG. 4 is a partial flowchart depicting a model generating method of the second embodiment.

A second embodiment of the present invention is a model generating method and a flowchart thereof is depicted in FIG. 4. The model generating method 400 is adapted for use in an electronic apparatus. The electronic apparatus comprises a storage, a transceiver interface, and a processor (e.g., the model generating apparatus 1 of the first embodiment). The electronic apparatus may store a self-supervised neural network (e.g., the self-supervised neural network 100 of the first embodiment). The model generating method 400 generates a task model through the steps S401 to S409.

First, in the step S401, the electronic apparatus receives a plurality of sample images through the transceiver interface. Next, in the step S403, the electronic apparatus generates a plurality of adversarial samples corresponding to the sample images.

Next, in the step S405, the electronic apparatus inputs the sample images and the adversarial samples respectively to a first encoder and a second encoder in the self-supervised neural network to generate a plurality of first feature extractions and a plurality of second feature extractions, wherein the first feature extractions are generated by the first encoder, and the second feature extractions are generated by the second encoder.

Next, in the step S407, the electronic apparatus calculates a similarity of each of the first feature extractions and the second feature extractions to train the self-supervised neural network.

Finally, in the step S409, the electronic apparatus generates a task model based on the first encoder and a plurality of labeled data.

In some embodiments, the self-supervised neural network further comprises an online neural network and a target neural network, the first encoder corresponds to the online neural network, and the second encoder corresponds to the target neural network.

In some embodiments, the model generating method 400 further comprises the following steps: performing an adversarial attack on each of the sample images to generate the adversarial samples corresponding to each of the sample images.

In some embodiments, the adversarial samples generated through the adversarial attack have a many-to-one relationship with the sample images.

In some embodiments, the model generating method 400 further comprises the following steps: classifying the sample images and the adversarial samples to generate a plurality of corresponding training sets, wherein each of the corresponding training sets comprises a first sample image of the sample images and a first adversarial sample corresponding to the first sample image.

In some embodiments, the model generating method 400 further comprises the following steps: performing the following operations for each of the corresponding training sets: inputting the first sample image to the first encoder to generate a corresponding first feature extraction corresponding to the first sample image; and inputting the first adversarial sample to the second encoder to generate a corresponding second feature extraction corresponding to the first adversarial sample.

In some embodiments, the model generating method 400 further comprises the following steps: performing the following operations for each of the corresponding training sets: calculating the similarity between the corresponding first feature extraction corresponding to the first sample image and the corresponding second feature extraction corresponding to the first adversarial sample to train the self-supervised neural network.

In some embodiments, the model generating method 400 further comprises the following steps: performing the following operations for each of the corresponding training sets: updating the second encoder based on an exponential moving average corresponding to the first encoder.

In some embodiments, the model generating method 400 further comprises the following steps: calculating the similarity of each of the first feature extractions and the second feature extractions based on a plurality of loss functions; and updating the first encoder based on the similarity corresponding to the loss functions.

In some embodiments, the model generating method 400 further comprises the following steps: concatenating at least one newly added layer after the first encoder, wherein the at least one newly added layer corresponds to a downstream task; inputting the labeled data into the first encoder and the at least one newly added layer to fine-tune the at least one newly added layer; and generating the task model corresponding to the downstream task based on the first encoder and the at least one newly added layer after fine-tuning.

In addition to the aforesaid steps, the second embodiment can also execute all the operations and steps of the model generating apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present invention, some words (e.g., the encoder, the feature extractions, the sample image, and the adversarial sample) are preceded by terms such as "first" or "second," and these terms of "first" and "second" are only used to distinguish these different words. For example, the "first" and "second" in the first feature extractions and the second feature extractions are only used to indicate the feature extractions generated by different encoders.

According to the above descriptions, the model generating technology (at least comprises the apparatus and the method) provided by the present disclosure generates a plurality of adversarial samples corresponding to the plurality of sample images, and trains the first encoder and the second encoder in the self-supervised neural network based on the sample images and the adversarial samples to enhance the feature extraction ability of the first encoder. Therefore, the ability of the first encoder to resist adversarial attacks can be improved. In addition, the model generation technology provided by the present disclosure can quickly generate task models for various downstream tasks based on the trained first encoder and a plurality of labeled data, thereby solving the problem of the training cost of the entire task model in the prior art. Furthermore, the model generating technology provided by the present disclosure only uses the labeled data for fine-tuning when training the task model, and does not need to add adversarial samples to the training data. Therefore, the accuracy of the trained model will not be reduced, and the problem of accuracy decline caused by the prior art will be solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A model generating apparatus, comprising:
    a storage, being configured to store a self-supervised neural network;
    a transceiver interface; and
    a processor, being electrically connected to the storage and the transceiver interface, and being configured to perform operations comprising:
        receiving a plurality of sample images through the transceiver interface;
        generating a plurality of adversarial samples corresponding to the sample images;
        inputting the sample images and the adversarial samples respectively to a first encoder and a second encoder in the self-supervised neural network to generate a plurality of first feature extractions and a plurality of second feature extractions, wherein the first feature extractions are generated by the first encoder, and the second feature extractions are generated by the second encoder;
        calculating a similarity of each of the first feature extractions and the second feature extractions to train the self-supervised neural network; and
        generating a task model based on the first encoder and a plurality of labeled data.

2. The model generating apparatus of claim 1, wherein the self-supervised neural network further comprises an online neural network and a target neural network, the first encoder corresponds to the online neural network, and the second encoder corresponds to the target neural network.

3. The model generating apparatus of claim 1, wherein the processor is further configured to perform the following operations:
    performing an adversarial attack on each of the sample images to generate the adversarial samples corresponding to each of the sample images.

4. The model generating apparatus of claim 3, wherein the adversarial samples generated through the adversarial attack have a many-to-one relationship with the sample images.

5. The model generating apparatus of claim 1, wherein the processor is further configured to perform the following operations:
    classifying the sample images and the adversarial samples to generate a plurality of corresponding training sets, wherein each of the corresponding training sets comprises a first sample image of the sample images and a first adversarial sample corresponding to the first sample image.

6. The model generating apparatus of claim 5, wherein the processor is further configured to perform the following operations:
    performing the following operations for each of the corresponding training sets:
        inputting the first sample image to the first encoder to generate a corresponding first feature extraction corresponding to the first sample image; and
        inputting the first adversarial sample to the second encoder to generate a corresponding second feature extraction corresponding to the first adversarial sample.

7. The model generating apparatus of claim 6, wherein the processor is further configured to perform the following operations:
    performing the following operations for each of the corresponding training sets:
        calculating the similarity between the corresponding first feature extraction corresponding to the first sample image and the corresponding second feature extraction corresponding to the first adversarial sample to train the self-supervised neural network.

8. The model generating apparatus of claim 7, wherein the processor is further configured to perform the following operations:
performing the following operations for each of the corresponding training sets:
updating the second encoder based on an exponential moving average corresponding to the first encoder.

9. The model generating apparatus of claim 1, wherein the processor further performs the following operations:
calculating the similarity of each of the first feature extractions and the second feature extractions based on a plurality of loss functions; and
updating the first encoder based on the similarity corresponding to the loss functions.

10. The model generating apparatus of claim 1, wherein the processor further performs the following operations:
concatenating at least one newly added layer after the first encoder, wherein the at least one newly added layer corresponds to a downstream task;
inputting the labeled data into the first encoder and the at least one newly added layer to fine-tune the at least one newly added layer; and
generating the task model corresponding to the downstream task based on the first encoder and the at least one newly added layer after fine-tuning.

11. A model generating method, being adapted for use in an electronic apparatus, wherein the electronic apparatus comprises a storage, a transceiver interface, and a processor, the storage is configured to store a self-supervised neural network, and the model generating method comprises the following steps:
receiving a plurality of sample images through the transceiver interface;
generating a plurality of adversarial samples corresponding to the sample images;
inputting the sample images and the adversarial samples respectively to a first encoder and a second encoder in the self-supervised neural network to generate a plurality of first feature extractions and a plurality of second feature extractions, wherein the first feature extractions are generated by the first encoder, and the second feature extractions are generated by the second encoder;
calculating a similarity of each of the first feature extractions and the second feature extractions to train the self-supervised neural network; and
generating a task model based on the first encoder and a plurality of labeled data.

12. The model generating method of claim 11, wherein the self-supervised neural network further comprises an online neural network and a target neural network, the first encoder corresponds to the online neural network, and the second encoder corresponds to the target neural network.

13. The model generating method of claim 11, wherein the model generating method further comprises the following steps:
performing an adversarial attack on each of the sample images to generate the adversarial samples corresponding to each of the sample images.

14. The model generating method of claim 13, wherein the adversarial samples generated through the adversarial attack have a many-to-one relationship with the sample images.

15. The model generating method of claim 11, wherein the model generating method further comprises the following steps:
classifying the sample images and the adversarial samples to generate a plurality of corresponding training sets, wherein each of the corresponding training sets comprises a first sample image of the sample images and a first adversarial sample corresponding to the first sample image.

16. The model generating method of claim 15, wherein the model generating method further comprises the following steps:
performing the following operations for each of the corresponding training sets:
inputting the first sample image to the first encoder to generate a corresponding first feature extraction corresponding to the first sample image; and
inputting the first adversarial sample to the second encoder to generate a corresponding second feature extraction corresponding to the first adversarial sample.

17. The model generating method of claim 16, wherein the model generating method further comprises the following steps:
performing the following operations for each of the corresponding training sets:
calculating the similarity between the corresponding first feature extraction corresponding to the first sample image and the corresponding second feature extraction corresponding to the first adversarial sample to train the self-supervised neural network.

18. The model generating method of claim 17, wherein the model generating method further comprises the following steps:
performing the following operations for each of the corresponding training sets:
updating the second encoder based on an exponential moving average corresponding to the first encoder.

19. The model generating method of claim 11, wherein the model generating method further comprises the following steps:
calculating the similarity of each of the first feature extractions and the second feature extractions based on a plurality of loss functions; and
updating the first encoder based on the similarity corresponding to the loss functions.

20. The model generating method of claim 19, wherein the model generating method further comprises the following steps:
concatenating at least one newly added layer after the first encoder, wherein the at least one newly added layer corresponds to a downstream task;
inputting the labeled data into the first encoder and the at least one newly added layer to fine-tune the at least one newly added layer; and
generating the task model corresponding to the downstream task based on the first encoder and the at least one newly added layer after fine-tuning.

* * * * *